United States Patent [19]
Zahorsky

[11] 3,854,494
[45] Dec. 17, 1974

[54] SAFETY VALVE
[75] Inventor: John Richard Zahorsky, Norwood, Mass.
[73] Assignee: Crosby Valve & Gage Company, Wrentham, Mass.
[22] Filed: Feb. 4, 1974
[21] Appl. No.: 439,437

[52] U.S. Cl. .................. 137/472, 137/478
[51] Int. Cl. ............................. F16k 17/04
[58] Field of Search .......... 137/472, 475, 476, 477, 137/478

[56] References Cited
UNITED STATES PATENTS
| | | | |
|---|---|---|---|
| 1,925,323 | 9/1933 | Hopkins | 137/478 |
| 2,880,751 | 4/1959 | Tobis | 137/478 |
| 3,401,718 | 9/1968 | Bowen | 137/478 X |
| 3,702,142 | 11/1972 | Richardson | 137/478 X |

FOREIGN PATENTS OR APPLICATIONS
| | | | |
|---|---|---|---|
| 418,319 | 10/1934 | Great Britain | 137/477 |

Primary Examiner—Harold W. Weakley
Attorney, Agent, or Firm—Kenway & Jenney

[57] ABSTRACT

A spring-loaded safety relief valve for a high pressure boiler or the like. A valve disk holder overhangs a nozzle and slides with clearance in a sleeve. The valve spindle carries a piston sealing a pressure chamber from a spring bonnet vented to atmosphere. A guide ring adjustable on the sleeve defines with the sleeve and disk holder an eductor arrangement operative when the valve is open to control to a limited degree the build-up pressure within the chamber.

9 Claims, 2 Drawing Figures

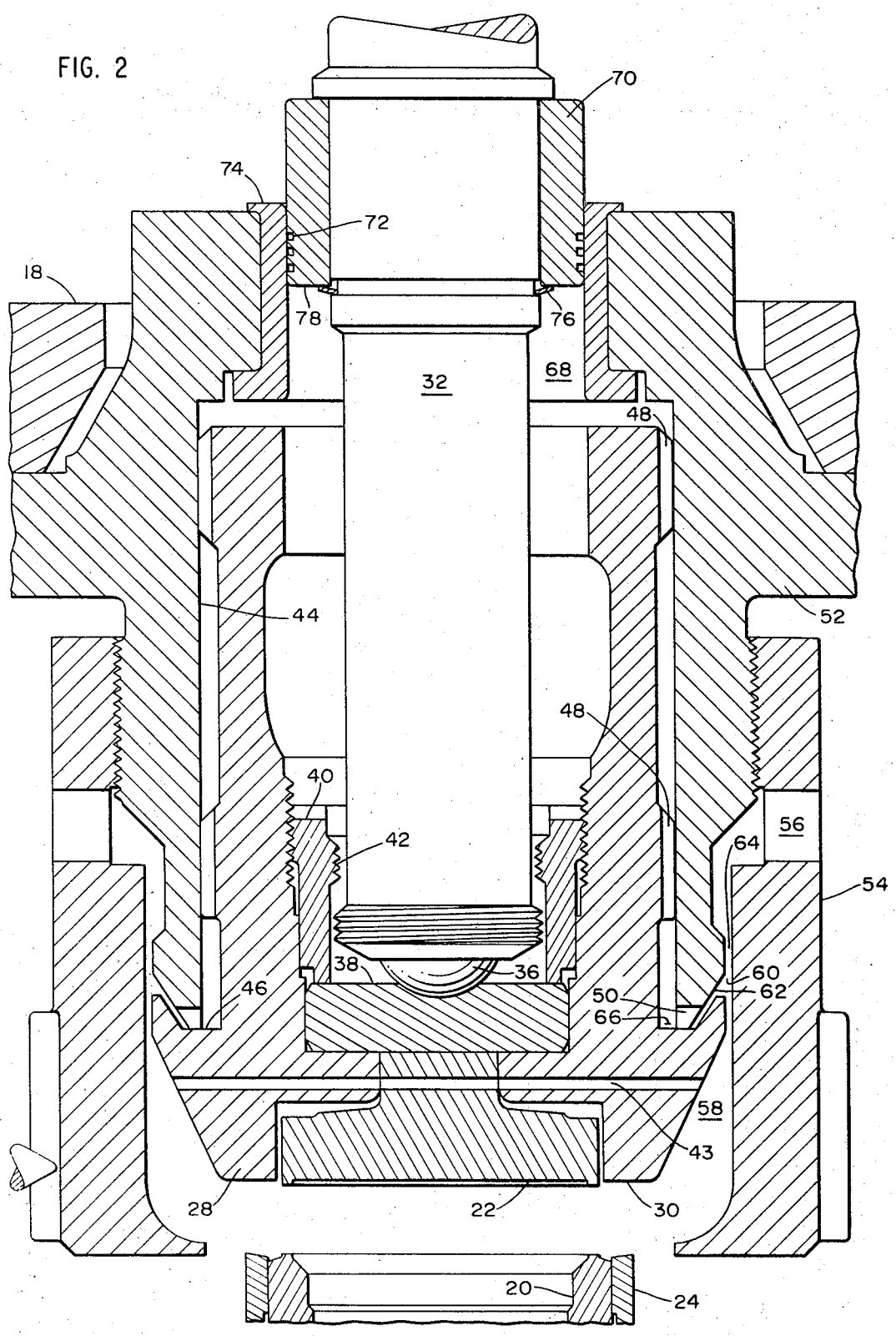

SAFETY VALVE

BACKGROUND OF THE INVENTION

This invention relates to safety valves, and more specifically to spring loaded safety relief valves for high pressure systems vented to atmosphere.

In high pressure systems, such as steam boilers and the like, it is necessary to have a safety relief valve that cracks open to release pressure at a set value, reaches a full open position quickly, and closes or reseats after the pressure falls to a safe level. Generally accepted criteria are that the valve should open fully when the system or boiler pressure is within three percent above the set pressure and that it should reseat when the system pressure is within four percent below the set pressure. These characteristics are commonly termed a three percent "full lift" and a four percent "blowdown."

It is well known in the art to achieve a 3 percent full lift by utilizing a valve piston having a seating face that overhangs the seat or nozzle. A spring that urges the valve to close is adjusted so that the valve cracks or begins to open at the set pressure, whereupon a "build-up" pressure due to fluid flow in the valve outlet then acts on the overhang area of the valve face in addition to the area defined by the seat. The resulting additional upward force quickly "pops" the valve to its full lift position. This action is frequently aided by a nozzle ring and a guide ring, both adjustable, which are well known. In the full lift position the rate of flow of fluid from the boiler or other vessel to the valve outlet is limited by the nozzle bore and the pressure is therefore reduced in a minimum time. As the pressure falls, the lift force acting on the full valve force is reduced until the spring force is dominant and the valve reseats suddenly.

Although conventional safety relief valves of the type described operate effectively at low to medium pressures, serious obstacles arise when they are used in systems operating at high pressures, for example pressures in the range of 1,500 to 3,000 pounds per square inch (psi). At these pressures it is extremely difficult to control the lifting force, as balanced against the spring force, so that the valve operates within a 3 percent full lift and a four percent blowdown. These difficulties are characterized by the fact that if the full lift criteria are met, the blowdown pressure is more than four percent below the set pressure. One solution is to use a heavier spring. It was found, however, that the extra spring force did not allow the valve to open fully within the desired overpressure. Other attempted solutions include alterations in the shape of the valve, various combinations of springs and dimensional changes in the valve, and the application of an auxiliary closing force. An example of the latter method is disclosed in U.S. Pat. No. 3,401,718 issued Sept. 17, 1968 to W. H. Bowen, et al. The auxiliary force is generated by creating a limited pressure chamber over the surface of the valve piston opposite to the seat or nozzle. After the valve pops open, the chamber develops a back pressure limited by an overlap collar on the spindle which has lifted to vent the chamber, thus avoiding an excessively sudden closing of the valve. This arrangement has disadvantages. When the valve recloses and the collar seals, the back pressure build up may become so sudden and large that the valve slams closed with sufficient force to damage the valve piston or the seat. Further, when the valve is seated, residual fluids in the chamber then act on the valve face causing the valve to reopen. This results in a highly undesirable rapid cycle operation known as "chatter."

U.S. Pat. No. 2,880,751 issued Apr. 7, 1959 to R. A. Tobis, et al, discloses another safety valve that utilizes a chamber above the valve piston to assist the valve closing. This valve, however, is designed to operate with a closed bonnet that does not vent to the atmosphere. When the valve is closed any superimposed back pressure at the valve outlet communicates with the chamber, and acts to hold the valve closed and therefore changes the set pressure. Thus, it is necessary that the superimposed back pressure be held to an acceptable level. The Tobis valve also has means to achieve reduction by build-up back pressure in the chamber after opening, by placing an eductor sleeve in the chamber, within the walls of the valve sleeve and disposed in the fluid stream between the fluid inlet to the chamber and the valve outlet passage.

It is an object of this invention to provide a high pressure safety relief valve with a spring bonnet vented to atmosphere that achieves full lift at a minimal overpressure and that also has an acceptably small blowdown.

Another object is to provide a safety valve that achieves these operating conditions without damaging the valve on closing, or causing chatter.

Still another object is to provide a safety valve that has a controlled, balanced operation.

Yet another object is to provide a safety valve that is reliable, easily adjusted, and does not substantially increase the cost of manufacture as compared to conventional safety valves.

SUMMARY OF THE INVENTION

A principal feature of the safety valve of this invention is a venturi surface formed on the outer end portion of the valve sleeve, coacting with an apertured guide ring to control the flow of effluent fluid to a chamber formed over the valve piston. The venturi surface, in cooperation with the guide ring that forms an axially adjustable extension of the sleeve, forms a first upwardly narrowing annular eductor passage that communicates with an exit aperture port or ports formed in the guide ring at a point or points above the venturi passage. A second upwardly narrowing annular passage located directly below the first passage is formed by and between the valve disk holder and the guide ring. Apertures machined in the lower end of the sleeve and machined channels in the guiding diameter of the disk holder against the sleeve provide fluid communication from the valve face to the chamber, and the rate of build-up of pressure in the chamber is thereby controlled.

A piston mounted on the valve stem is slidable in a bushing in the upper portion of the sleeve and thereby seals the chamber. The piston also provides a pressure surface to balance some of the build-up pressure closing force on the side of the disk holder opposite to the nozzle, and therefore cushions the closing movement of the valve. Another pressure chamber, also controlled by the annular passages, acts on an overhanging lip of the valve piston located below the lower sleeve end.

These and other features and objects of the invention will be more fully understood from the following detailed description which should be read in connection with the drawings.

BRIEF DESCRIPTION OF THE DRAWINGS

FIG. 2 is an enlarged view of the central portion of FIG. 1 showing the valve in the full lift position.

DETAILED DESCRIPTION OF THE PREFERRED EMBODIMENTS

Figure 1:
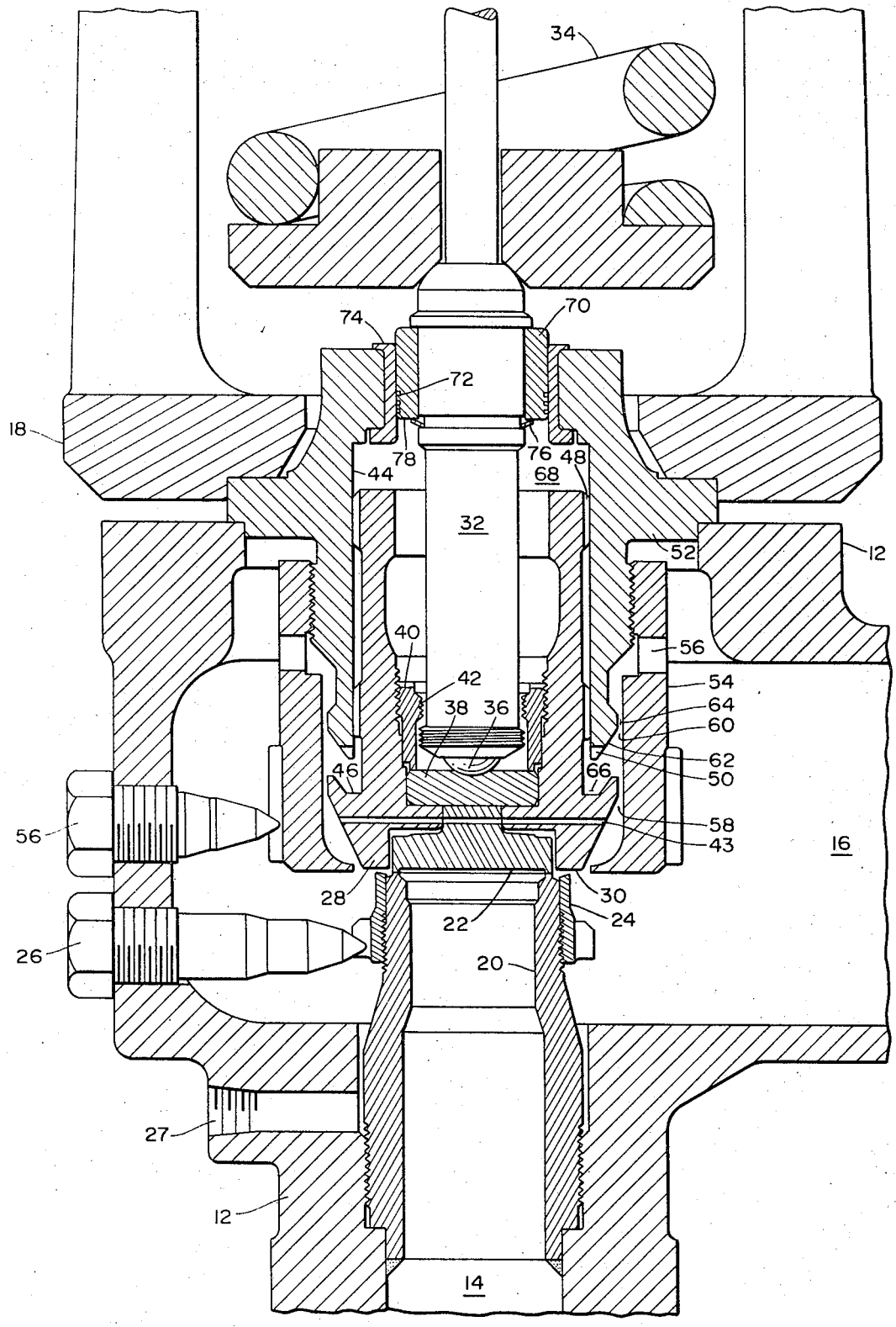
FIG. 1 is a sectional elevation of a safety relief valve embodying the features of this invention and showing the valve in the seated position.

The valve shown in FIGS. 1 and 2 is enclosed within a body 12 having an inlet passage 14 and an outlet passage 16. Attached to the upper portion of the body 12 is a spring bonnet 18, only the lowest portion of which is shown. The bonnet 18 and the outlet passage 16 are open to the atmosphere. A nozzle 20 is threaded into the inlet passage of the body 12. The upper end or seat of the nozzle 20 is engaged by a valve disk insert 22. An adjustable nozzle ring 24 of known form is threaded onto the nozzle and retained by a set screw 26. A threaded hole 27 in the body 12 provides drainage.

A disk holder 28 together with the disk insert 22 form the head or piston of the valve. When the valve is open the build-up pressure due to the flow of fluid acts on the overhanging area 30 of the disk holder 28 to add to the lifting force on the valve, causing it to "pop" open. The disk insert 22 is restrained against the inlet pressure by a spindle or valve stem 32 urged downwardly by a spring 34. The spindle 32 has a spindle ball 36 at its lower end which bears on an insert bearing 38 disposed between the spindle ball and the disk insert 22. A retaining ring 40 threaded to the disk holder retains the bearing 38 in position. The retaining ring 40 also has inward facing threads 42 that retain the spindle 32 in relation to the disk holder 28. A pin (not shown) inserted in the hole 43 retains the disk insert 22 in the holder 28.

The disk holder 28 slides freely in a cylindrical valve sleeve 44 between a closed or seated position shown in FIG. 1 and a full lift position shown in FIG. 2. In the full lift position, the lower end of the sleeve 44 is in contact with an upper lip surface 46 of the disk holder 28. Channels 48 in the guiding diameter of the disk holder 28 provide a fluid passage between the disk holder and the sleeve 44. Apertures 50 formed in the lower end of the sleeve 44 provide a fluid passage between the lip 46 and the sleeve when the valve is in the full lift position. The sleeve 44 is supported by a flanged portion 52 mounted between the body 12 and the bonnet 18.

Threaded to the exterior surface of the sleeve 44 is an axially adjustable guide ring 54 which is retained by a set screw 56. The upper end of the guide ring 54 contains a series of ports 56 that communicate with the outlet passage 16. In the clearance space between the guide ring and disk holder 28 is an upwardly narrowing annular passage 58. Directly above the passage 58 is another upwardly narrowing annular passage 60 defined by the interior surface of the guide ring 54 and a venturi surface 62 formed on the outer end surface of the sleeve 44.

The venturi surface 62 slopes outwardly from the bottom edge of the sleeve 44 to a minimum clearance region 64 of the passage 60. Above the region 64, the venturi surface slopes back towards the disk holder 28 to provide an enlarged passage formed between the sleeve 44 and the guide ring 54 that leads to the ports 56. When the valve is in the full lift position, the venturi surface 62, in cooperation with the passage 58, controls the flow of the effluent fluid through the apertures 50 to chambers 66 and 68.

At its narrowest point the passages 58 defines a flow area that is typically ten to twenty percent of the total flow area of the passage 58 plus the flow area located between the nozzle ring 24 and the guide ring 54. Further, the area of passage 60 always exceeds that of passage 58. Expressed as a percentage, the area of passage 58 is approximately 60 to 80 percent of the area of passage 60.

The chamber 66 is formed over the upper lip surface 46 to provide a downward closing force on the valve. The chamber 68 is located directly above the disk holder 28 in a region defined by the disk holder, the upper portion of the sleeve 44, and a piston 70. The piston 70 is mounted around a portion of the spindle 32 with a labyrinth seal 72 formed on its outer surface. The seal 72 is in contact with a bushing 74 mounted on the sleeve 44. A snap ring 76 retains piston 70 on the spindle 32. The piston 70 and labyrinth seal 72 serve to contain the fluid diverted to the chambers 66 and 68 by the control passages 58 and 60. Also, the lower surface 78 of the piston 70 provides a pressure surface that tends to cushion the closing movement of the valve. Preferably the outer diameter of the piston 70 is approximately the same as that of the disk insert 22.

When the valve is closed, as shown in FIG. 1, the system pressure in the inlet passage 14 and nozzle 20 acts on the seating area of the disk insert 22. The resulting force that tends to open the valve is the product of the system pressure and the seating area. This force is opposed by the spring force urging the disk insert to remain seated. The spring 34 is gauged and adjusted so that these opposing forces are in balance at a preselected set pressure. When the system pressure increases above this set pressure, the valve will crack and a small amount of fluid will pass through the seating contacts of the disk insert 22 and the nozzle 20. The nozzle ring 24 deflects the stream upward toward the surface 30. The additional force on the surface 30 forces the valve to open further thereby establishing a fluid flow through the nozzle and across the seating plane. After crossing the seating plane, the lower inner diameter of the guide ring 54 directs the stream through the outside passage 58, exerting an additional upward pressure force on the disk holder 28. As the valve lift progresses in the lifting cycle, the fluid flow also enters the annular passage between the nozzle ring 24 and the lower lip of the guide ring 54, exerting a further reaction force on the disk holder 28. This fluid flow occurs extremely rapidly, causing a sudden increase in the upward force on the valve piston that pops the valve to the full lift position shown in FIG. 2 within a three percent overpressure. The valve pops so rapidly that the fluid stream cannot build up any appreciable pressure in the chambers 66 and 68 during the opening cycle.

With reference to FIG. 2, after achieving a full lift, the annular passage 58 directs the effluent fluid stream at a high velocity into the passage 60. The narrowing of these passages acts to increase the velocity of the stream and decrease its pressure in the region of minimum clearance. This creates a pressure differential between the main fluid path defined by the passages 58 and 60 and the path feeding the chambers 66 and 68 defined by the apertures 50 and the channels 48. As a result of the higher pressure in the chamber feed path, the venturi surface diverts only a portion of the fluid to the chambers. Stated in terms of pressure, the pressure in the chambers 66 and 68 is maintained at a fraction of the system pressure. For purposes of illustration only, if the system pressure is 1,500 psi, a typical pressure in the chambers 66 and 68 is approximately 40 to 50 percent as great, or 600 to 750 psi. This pressure also depends on the disk position during its lifting cycle.

This pressure differential is highly desirable since the valve would either slam shut and damage the valve parts, or close prematurely before a sufficient amount of fluid is released from the system, if a higher pressure is applied to the chambers. It should be noted that variations in the amount of fluid flowing through the passages 58 and 60 will cause some change in the pressure differential.

During full lift, the principal forces keeping the valve open are the pressure acting on the disk insert and the disk holder to its extreme outer diameter at the narrowest region of the passage 58 and the reaction forces developed by the fluid acting on the nozzle ring 24 and the inner lower edge of the guide ring 54. Forces tending to close the valve are the spring compression and the controlled pressure in the chamber 66 and 68 acting on the exposed upward facing surfaces. The pressure in the chamber 66 acts over the upward facing lip surface 46 from the guiding diameter of the disk holder 28 to its widest diameter at the passage 58. The pressure in the chamber 68 acts on the upper surfaces of the disk holder 28. This force, however, is partially offset by the same pressure acting on the downward facing surface 78 of the piston 70 and other downward facing surfaces in the disk holder which are exposed to the pressure in the chamber 68.

When system pressure at the nozzle 20 decays, the pressure acting on the disk holder face across its total diameter at passage 58 also decays and fluid released through the passages 58 and 60 to the exhaust ports 56 which controls the pressure in chamber 68 will have also decayed to a point where the closing forces described above become dominant and the disk holder starts to move downwardly. This is the beginning of the closing cycle. This in turn causes the lip surface 46 to separate from the lower end of the sleeve 44 allowing more fluid to be diverted to the chambers. Therefore the pressure developed in the chambers does not decrease in the same proportion as the pressures acting on the disk insert 22 and the overhang area 30. The net effect of this force unbalance is a rapid, controlled closing of the valve within a four percent or lower blowdown.

After the valve has seated, the residual fluid in the chambers 66 and 68 continues to exert a net downward closing force as the fluid reverses its direction of flow and exhausts completely through the ports 56. An advantage of this invention is that the residual fluids exhaust after closing the valve rather than act on the overhang surface 30 of the disk holder causing the valve to re-open and chatter.

This description therefore discloses a safety relief valve for high pressure systems with spring bonnets venting to atmosphere that achieves a full lift within a three percent over pressure and closes with a four percent blowdown. Additionally, the safety relief valve of the invention is not prone to chatter, slam down closings, or premature closings. Various modifications of the invention will become apparent to those skilled in the art from the foregoing description and accompanying drawings. Such modifications are intended to fall within the scope of the appended claims.

What is claimed is:

1. A safety relief valve having, in combination,
  a body having inlet and outlet passages, a valve seat communicating with said passages and a sleeve coaxial with the seat, said sleeve having a guide ring forming an axially adjustable extension thereof with a port through the guide ring communicating with the outlet passage, and
  a valve head slidable with clearance in the sleeve having a stem slidable relative to said body with a portion in position to close upon said seat, said valve head and sleeve defining a chamber, said sleeve having an outer venturi end surface forming a first passage communicating with said port and narrowing in the direction from the interior of the guide ring toward the outlet passage.

2. A safety relief valve according to claim 1 further characterized by a piston attached to said stem and slidably engaged with an upper portion of said sleeve.

3. A safety relief valve according to claim 1 further characterized by a piston attached to said stem and slidably engaged with said body.

4. A safety relief valve according to claim 2 further characterized by said piston having a labyrinth seal disposed between said piston and said upper sleeve portion.

5. A safety relief valve according to claim 1 wherein said head has a sloped surface forming a second passage communicating with the first passage, said second passage being located below the first passage and narrowing in the same direction as the first passage.

6. A safety valve according to claim 5 wherein said head has a lip extending beyond the lower end of the sleeve to a region between the first and second passages.

7. A safety relief valve according to claim 1 further characterized by a plurality of apertures formed in the lower edge of said sleeve.

8. A safety relief valve according to claim 2 wherein the outer diameter of said piston is approximately the same as the diameter of the seat.

9. A safety relief valve according to claim 5 wherein the narrowest region of said second passage defines an effective flow area that is in the range 10 to 20 percent of the maximum flow area within the valve, and the effective flow area of said second passage is approximately 60 to 80 percent of the effective flow area of said first passage.

* * * * *